United States Patent
Andry et al.

(10) Patent No.: US 11,258,132 B2
(45) Date of Patent: Feb. 22, 2022

(54) MICROBATTERY SEPARATOR

(71) Applicants: International Business Machines Corporation, Armonk, NY (US); Johnson & Johnson Vision Care, Inc., Jacksonville, FL (US)

(72) Inventors: Paul S. Andry, Yorktown Heights, NY (US); Eric Lewandowski, Morristown, NJ (US); Adam Toner, Saint Johns, FL (US); Daniel Otts, Pleasanton, CA (US); James Daniel Riall, Saint Johns, FL (US); Cornelia T. Yang, Medford, MA (US)

(73) Assignees: INTERNATIONAL BUSINESS MACHINES CORPORATION, Armonk, NY (US); JOHNSON & JOHNSON VISION CARE, INC., Jacksonville, FL (US)

( * ) Notice: Subject to any disclaimer, the term of this patent is extended or adjusted under 35 U.S.C. 154(b) by 222 days.

(21) Appl. No.: 16/540,752

(22) Filed: Aug. 14, 2019

(65) Prior Publication Data
US 2019/0372075 A1 Dec. 5, 2019

Related U.S. Application Data

(62) Division of application No. 14/978,535, filed on Dec. 22, 2015, now Pat. No. 10,388,929.

(51) Int. Cl.
*H01M 50/411* (2021.01)
*H01M 6/40* (2006.01)

(52) U.S. Cl.
CPC ............ *H01M 50/411* (2021.01); *H01M 6/40* (2013.01); *H01M 2220/30* (2013.01); *H01M 2300/0085* (2013.01)

(58) Field of Classification Search
None
See application file for complete search history.

(56) References Cited

U.S. PATENT DOCUMENTS

| | | | |
|---|---|---|---|
| 2,302,832 | A | 11/1942 | Behrman |
| 4,940,651 | A | 10/1990 | Brown et al. |
| 5,211,827 | A | 5/1993 | Peck |
| 5,882,721 | A | 3/1999 | Delnick |
| 5,948,464 | A | 7/1999 | Delnick |
| 6,148,503 | A | 11/2000 | Delnick et al. |
| 6,495,283 | B1 | 12/2002 | Yoon et al. |

(Continued)

FOREIGN PATENT DOCUMENTS

| | | |
|---|---|---|
| KR | 102008007692 A | 1/2008 |
| KR | 100882493 B1 | 2/2009 |

(Continued)

OTHER PUBLICATIONS

Office Action for U.S. Appl. No. 14/978,535 dated Aug. 14, 2018, 23 pages.

(Continued)

*Primary Examiner* — Jonathan Crepeau
(74) *Attorney, Agent, or Firm* — Amin, Turocy & Watson, LLP

(57) ABSTRACT

In one example, a battery includes a negative terminal, a positive terminal, an electrolyte contained between the negative terminal and the positive terminal, and a hydrogel layer positioned between and physically separating the negative terminal and the positive terminal.

20 Claims, 6 Drawing Sheets

(56) References Cited

U.S. PATENT DOCUMENTS

| | | |
|---|---|---|
| 9,715,130 B2 | 7/2017 | Otts et al. |
| 2005/0112471 A1 | 5/2005 | Chen et al. |
| 2011/0076568 A1 | 3/2011 | Bouillon |
| 2015/0214555 A1 | 7/2015 | Visco et al. |
| 2015/0280271 A1 | 10/2015 | Weis et al. |
| 2016/0054589 A1 | 2/2016 | Otts et al. |

FOREIGN PATENT DOCUMENTS

| | | |
|---|---|---|
| KR | 101310176 B1 | 9/2013 |
| KR | 101458212 B1 | 10/2014 |

OTHER PUBLICATIONS

Office Action for U.S. Appl. No. 14/978,535 dated Feb. 7, 2019, 19 pages.
List of IBM Patents or Applications Treated as Related.

MICROBATTERY SEPARATOR

FIELD OF THE DISCLOSURE

The present disclosure relates generally to electric batteries and relates more specifically to a separator for use in microbatteries.

BACKGROUND OF THE DISCLOSURE

All electrochemical cells or batteries contain a negative terminal (an anode) and a positive terminal (a cathode) that are separated from each other by an electrolyte. When a battery is connected to an external circuit, the electrolyte is able to move as ions within the battery, and chemical reactions occur at each terminal that deliver energy to the external circuit.

Physical separation of the positive terminal from the negative terminal is maintained by a permeable membrane or separator. Historically, separators have been fabricated from non-woven materials such as paper, porous rubber, celluloid, or cellophane. More recently, separators have been fabricated from some non-woven non-cellulosic polymers, including polyamides, polyvinyl alcohol (PVOH), polyesters, and polypropylenes.

SUMMARY OF THE DISCLOSURE

In one example, a battery includes a negative terminal, a positive terminal, an electrolyte contained between the negative terminal and the positive terminal, and a hydrogel layer positioned between and physically separating the negative terminal and the positive terminal.

In another example, a method of fabricating a battery includes forming a negative terminal, fabricating a separator on the negative terminal, wherein the separator comprises a hydrogel, forming a positive terminal on the separator, so that the separator physically separates the negative terminal from the positive terminal, and injecting an electrolyte between the negative terminal and the positive terminal

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the Figures.

DETAILED DESCRIPTION

In one example, a separator for use in microbatteries is disclosed. Within the context of the present invention, a "microbattery" describes a cell that is, at most, a few hundred microns thick and whose active electrode areas are on the order of a few square millimeters. In such batteries, many of the components (including current collectors, active anode metal, contact pads, and seals) may be most amenable to fabrication by photolithography.

Battery separators have conventionally been fabricated from non-woven materials such as paper, porous rubber, celluloid, or cellophane, and more recently from some non-woven non-cellulosic polymers, including polyamides, polyvinyl alcohol (PVOH), polyesters, and polypropylenes. These separators are typically made available as thin sheets delivered on rolls. Although such delivery is convenient for the production of large commercial batteries in standard cylindrical form factors (e.g., AA, AAA, button cells, coin cells, and the like), it is less suited to the production of very small, thin, flexible microbatteries. For instance, it is difficult and highly impractical to attempt to introduce a thin piece of sheet separator into a microbattery structure by physically picking and placing the separator into the space between the positive and negative terminals.

Examples of the present disclosure provide microbattery separators that are aligned to the features of the positive and negative terminals and that are process compatible with the fabrication build of the microbattery. Examples of the disclosed separator can be formed from a hydrogel, a photopatterned polymer mesh, or a combination of a hydrogel and a photo-patterned polymer mesh.

FIGS. 1A-1F illustrate cross sectional views of a microbattery structure 100 during various stages of a first fabrication process performed according to examples of the present disclosure. As such, when viewed in sequence, FIGS. 1A-1F also serve as a flow diagram for the fabrication process.

Figure 1A:
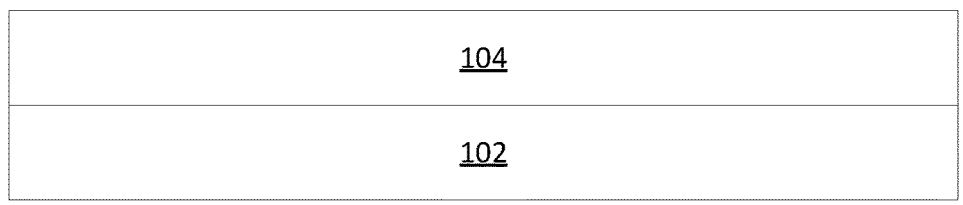
FIGS. 1A-1F illustrate cross sectional views of a microbattery structure during various stages of a first fabrication process performed according to examples of the present disclosure.

As illustrated in FIG. 1A, fabrication of the microbattery structure 100 begins by bonding a first polymer film layer 104 to a first glass substrate 102. In one example, the first polymer film layer 104 comprises a polyimide, such as poly (4,4'-oxydiphenylene-pyromellitimide), or polyethylene terephthalate (PET).

Figure 1B:
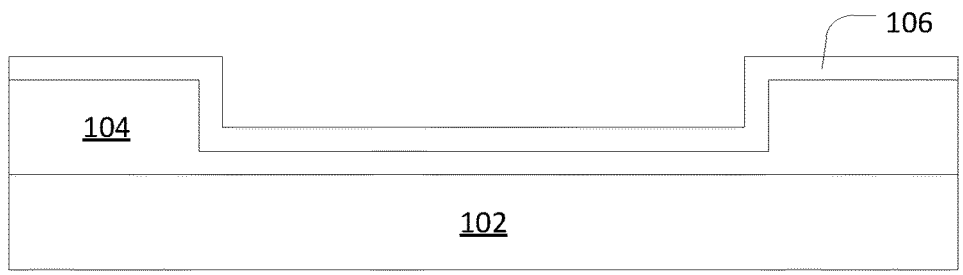

As illustrated in FIG. 1B, a trench is next created in the first polymer film layer 104. The trench may be formed, for example, by photolithography in combination with etching, or by embossing. The trench is subsequently lined with a first conformal metal layer 106. The first conformal metal layer 106 may be formed, for example, from titanium or from nickel.

Figure 1C:
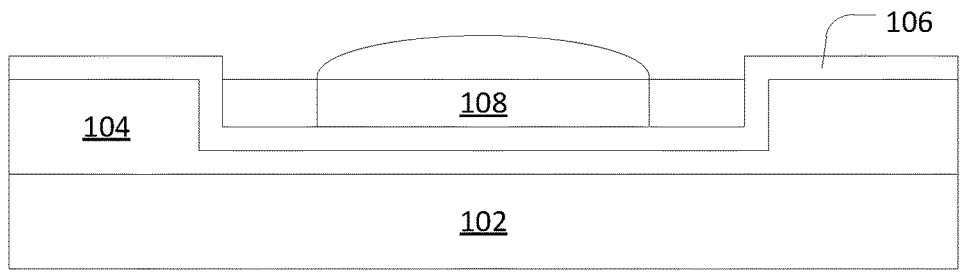

As illustrated in FIG. 1C, a negative terminal 108 is next plated on the first conformal metal layer 106, within the trench area. The negative terminal 108 may be formed, for example, from zinc, or from an alloy of zinc with indium or with tin. A hydrogel layer 110 is then applied to the negative terminal 108. For instance, the hydrogel layer 110 may be applied by precision dispensing, stenciling, injecting, or brushing onto the negative terminal 108. In one example, the hydrogel comprises a network of polymer chains that are hydrophilic. For instance, the hydrogel may comprise a colloidal gel in which water is the dispersion medium. As a specific example, the hydrogel may comprise a polyethylglycol (PEG)-based system with water and a photocatalyst, a polyvinylpyrrolidone (PVP)-based system with a photocatalyst, polyethylene oxide (PEO), poly vinyl alcohol (PVA), or polyacrylamide. In one example, the hydrogel layer 110 has a thickness of approximately ten to twenty micrometers. The hydrogel layer 110 will form the separator of the final microbattery structure 100.

Figure 1D:
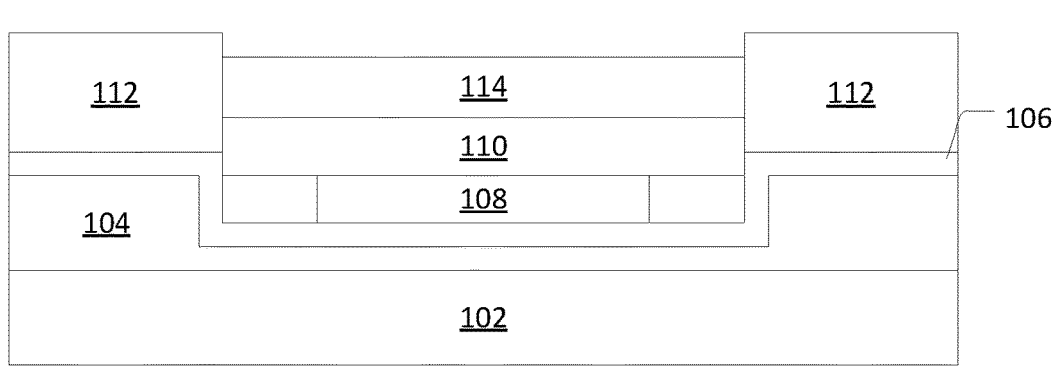

As illustrated in FIG. 1D, a seal 112 is deposited on the first conformal metal layer 106, outside of the trench, i.e., so that the seal 112 surrounds the trench, the negative terminal 108, and the hydrogel layer 110. A positive terminal 114 is then deposited on the hydrogel layer 110 and compresses the hydrogel layer 110. The positive terminal 114 may comprise, for example, a paste such as a manganese dioxide paste having particle sizes between approximately two and thirty micrometers. In further examples, however, the particle size can be even finer (e.g., down to the sub-micron level). As the hydrogel layer 110 compresses, it is held in place by the seal 112 and by the positive terminal 114. An electrolyte is also injected into the microbattery structure 100 and becomes absorbed by the hydrogel layer 110.

Figure 1E:
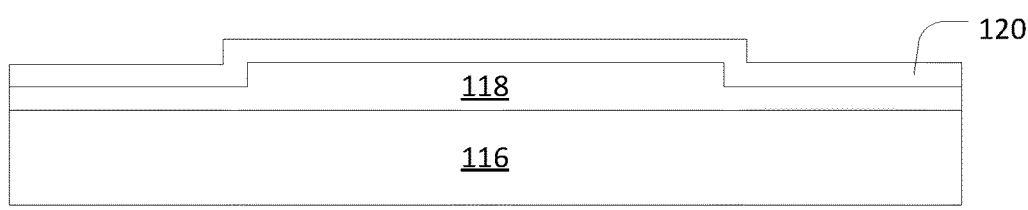

As illustrated in FIG. 1E, a pedestal is next fabricated, separately from the microbattery structure 100 that was assembled and depicted in FIGS. 1A-1D. Fabrication of the pedestal begins by bonding a second polymer film layer 118 to a second glass substrate 116. In one example, the second polymer film layer 118 comprises a polyimide, such as poly (4,4'-oxydiphenylene-pyromellitimide), or polyethylene terephthalate (PET). The second polymer film layer 118 may be etched to form a mesa or pedestal in its center, as illustrated. The second polymer film layer 118 is then coated with a second conformal metal layer 120. The second conformal metal layer 120 may comprise, for example, titanium, nickel, or indium tin oxide.

Figure 1F:
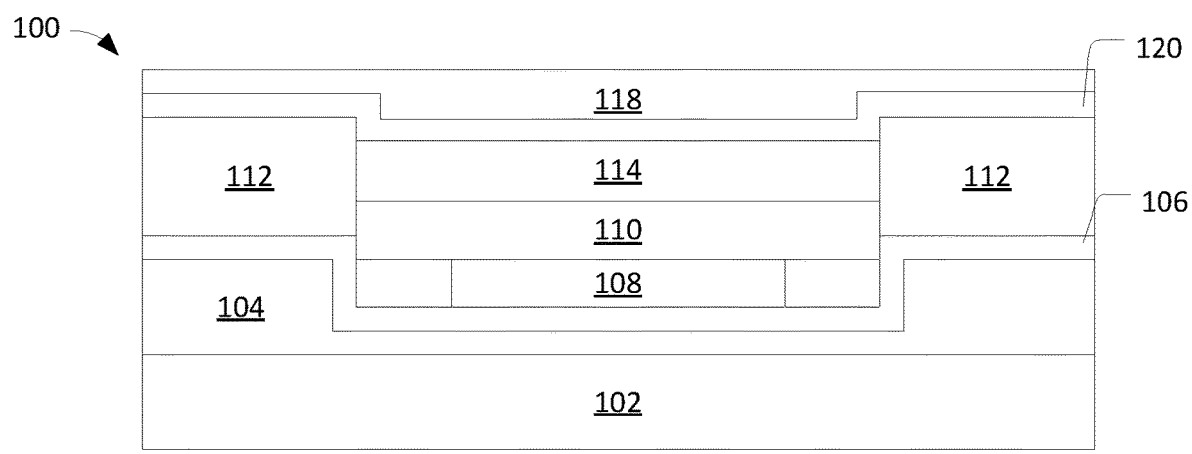

As illustrated in FIG. 1F, the pedestal illustrated in FIG. 1E is then assembled to the microbattery structure 100 that was assembled and depicted in FIGS. 1A-1D to seal the microbattery structure 100. In one example, this assembly step involves inverting the pedestal such that the second conformal metal layer 120 is positioned adjacent to the seal 112 and the positive terminal 114. In one example, the second glass substrate 116 is removed.

The hydrogel layer 110 of the microbattery structure 100 acts as a permeable separator between the negative terminal 108 and the positive terminal 114. The hydrophilic nature of the hydrogel layer 110 allows it to absorb the electrolyte that resides between the negative terminal 108 and the positive terminal 114, while the inclusion of a photocatalyst in the hydrogel layer 110 will allow the hydrogel layer 110 to be cured or cross-linked, e.g., such that the hydrogel layer 110 can be patterned where desired. The flexibility of and the ability to precisely apply the hydrogel layer 110 during fabrication of the microbattery structure 100 makes it an ideal separator for the very small scale microbattery structure 100. For instance, photolithography techniques may be used to define and align very small features with precision.

FIGS. 2A-2F illustrate cross sectional views of a microbattery structure 200 during various stages of a second fabrication process performed according to examples of the present disclosure. As such, when viewed in sequence, FIGS. 2A-2F also serve as a flow diagram for the fabrication process.

Figure 2A:
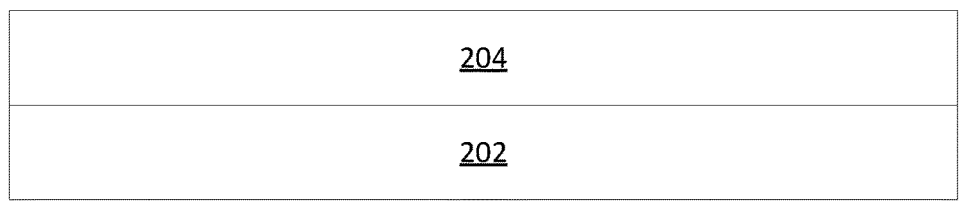
FIGS. 2A-2F illustrate cross sectional views of a microbattery structure during various stages of a second fabrication process performed according to examples of the present disclosure.

As illustrated in FIG. 2A, fabrication of the microbattery structure 200 begins by bonding a first polymer film layer 204 to a first glass substrate 202. In one example, the first polymer film layer 204 comprises polyimide, such as poly (4,4'-oxydiphenylene-pyromellitimide), or polyethylene terephthalate (PET).

Figure 2B:
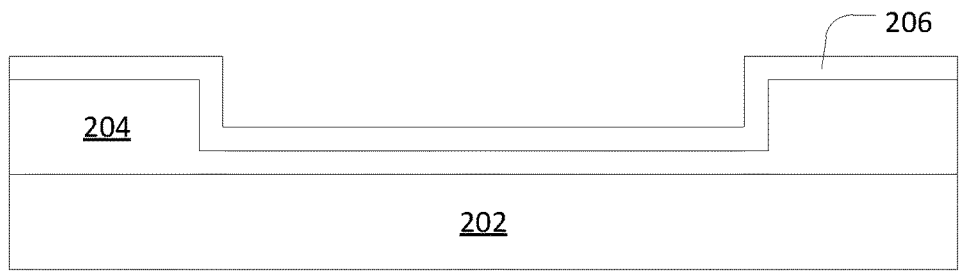

As illustrated in FIG. 2B, a trench is next created in the first polymer film layer 204. The trench may be formed, for example, by photolithography in combination with etching, or by embossing. The trench is subsequently lined with a first conformal metal layer 206. The first conformal metal layer 206 may be formed, for example, from titanium or from nickel.

Figure 2C:
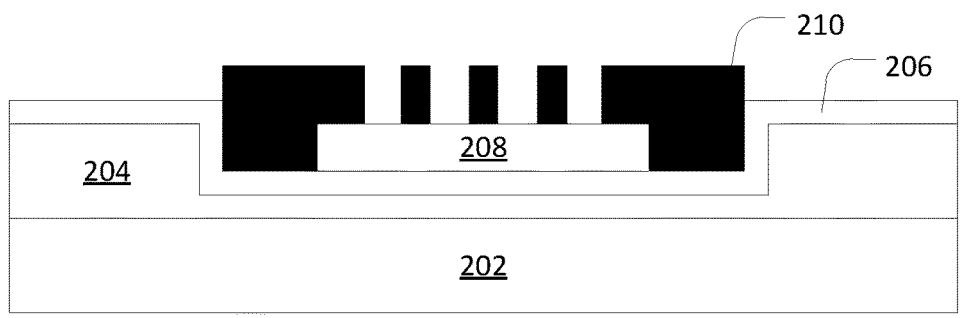

As illustrated in FIG. 2C, a negative terminal 208 is next plated on the first conformal metal layer 206, within the trench area. The negative terminal 208 may be formed, for example, from zinc, or from an alloy of zinc with indium or with tin. A photo-patternable polymer layer 210 is then applied to the negative terminal 208, for example by a spin coating process in which a photo-patternable polymer is applied in liquid form (e.g., in a range of approximately 750 to 3000 rpm), and excess liquid from the photo-patternable polymer is spun off the top surface of the negative terminal 208. In one example, this results in the photo-patternable polymer layer 210 having a thickness of approximately two micrometers; thus, the raised topography of the negative terminal 208 in this case allows for a thinner coating of the photo-patternable polymer to be applied to the negative terminal 208 (i.e., as comparted to the remainder of the microbattery structure 200). The photo-patternable polymer layer 210 is then patterned into a mesh, for example using a photolithography process. In one example, the photo-patternable polymer layer 210 may be soft-baked (i.e., pre-exposure) and/or post-exposure baked at a temperature within the range of approximately sixty-five to one hundred degrees Celsius, while a final hard bake may be performed at a temperature in the range of approximately 150 to 250 degrees Celsius. Thus, the final photo-patternable polymer layer 210 comprises a polymer mesh that is coated, aligned, and patterned in a manner similar to photoresist in a semiconductor line. The mesh may contain pores having a size of approximately two micrometers square. In one example, the photo-patternable polymer layer 210 comprises a phenoxy-based resin (e.g., one or more of a family of Bisphenol-A/epichlorohydrin linear polymers). For instance, the photo-patternable polymer layer 210 may contain a mixture of an epoxy, a phenoxy-based resin, and a solvent such as propylene glycol monomethyl ether acetate. The phenoxy-based resin may further include a photo-package to enable lithographic processing. The photo-patternable polymer layer 210 will form the separator of the final microbattery structure 200.

Figure 2D:
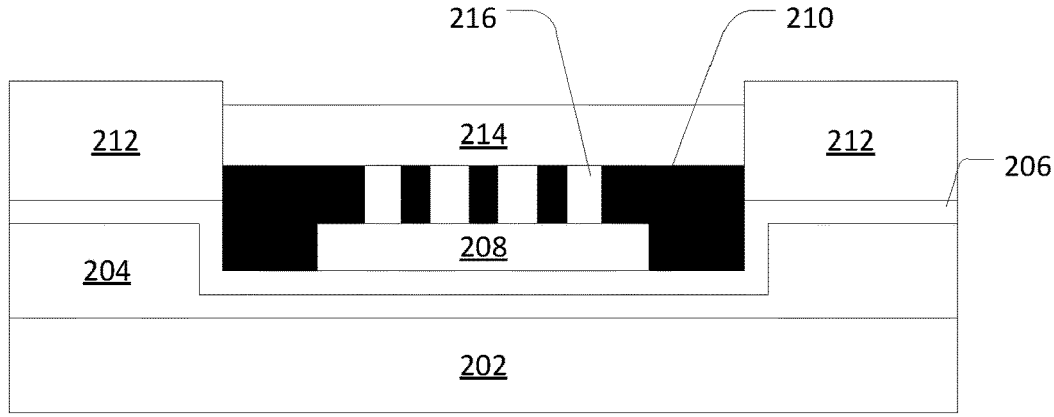

As illustrated in FIG. 2D, a seal 212 is deposited on the first conformal metal layer 206, outside of the trench, i.e., so that the seal 212 surrounds the trench, the negative terminal 208, and the photo-patternable polymer layer 210. An electrolyte 216 is injected into the microbattery structure 200 and is able to pass through the mesh of the photo-patternable polymer layer 210. A positive terminal 214 is then deposited on the photo-patternable polymer layer 210. The positive terminal 214 may comprise, for example, a paste such as a manganese dioxide paste having particle sizes between approximately two and thirty micrometers. The mesh structure of the photo-patternable polymer layer 210 prevents particles of the paste from clogging or breaking through the photo-patternable polymer layer 210 and contacting the negative terminal 208.

Figure 2E:
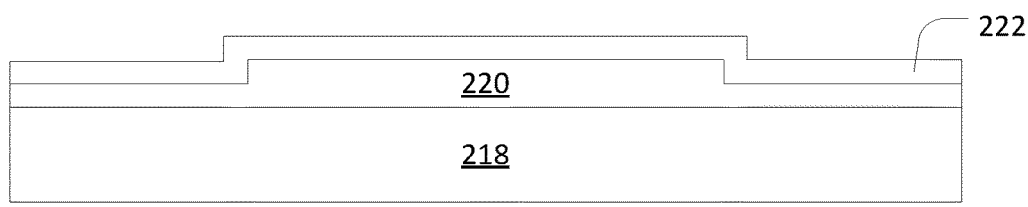

As illustrated in FIG. 2E, a pedestal is next fabricated, separately from the microbattery structure 200 that was assembled and depicted in FIGS. 2A-2D. Fabrication of the pedestal begins by bonding a second polymer film layer 220 to a second glass substrate 218. In one example, the second polymer film layer 220 comprises a polyimide, such as poly (4,4'-oxydiphenylene-pyromellitimide), or polyethylene terephthalate (PET). The second polymer film layer 220 may be etched to form a mesa or pedestal in its center, as illustrated. The second polymer film layer 220 is then coated with a second conformal metal layer 222. The second conformal metal layer 222 may comprise, for example, titanium, nickel, or indium tin oxide.

Figure 2F:
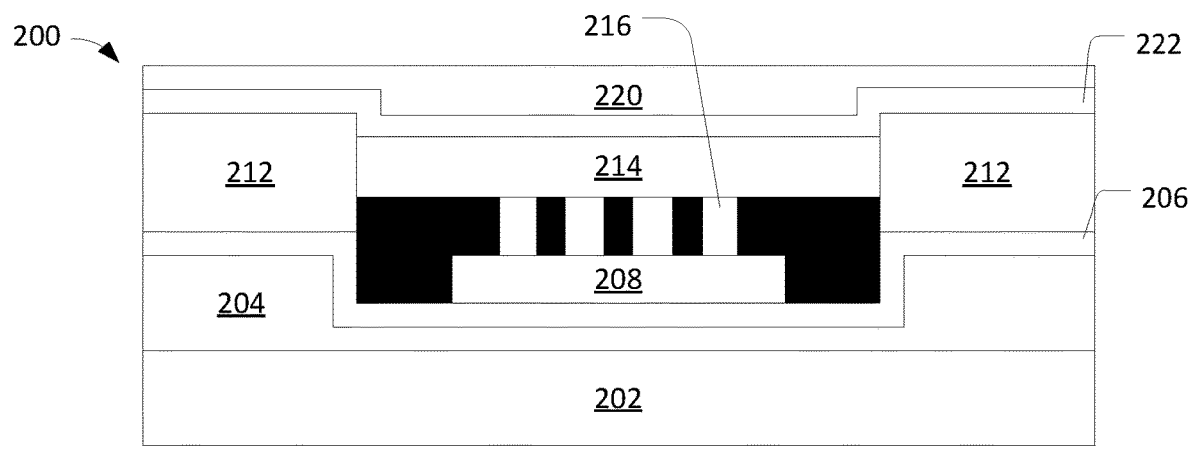

As illustrated in FIG. 2F, the pedestal illustrated in FIG. 2E is then assembled to the microbattery structure 200 that was assembled and depicted in FIGS. 2A-2D to seal the microbattery structure 200. In one example, this assembly step involves inverting the pedestal such that the second conformal metal layer 222 is positioned adjacent to the seal 212 and the positive terminal 214. In one example, the second glass substrate 218 is removed.

The mesh photo-patternable polymer layer 210 of the microbattery structure 200 acts as a permeable separator between the negative terminal 208 and the positive terminal 214. The mesh structure of the photo-patternable polymer layer 210 allows the electrolyte that resides between the negative terminal 208 and the positive terminal 214 to pass freely, while maintaining mechanical separation between the negative terminal 208 and the positive terminal 214. The ability to precisely apply and pattern the photo-patternable polymer layer 210 during fabrication of the microbattery structure 200 makes it an ideal separator for the very small scale microbattery structure 200. For instance, photolithography techniques may be used to define and align very small features with precision.

In a further example, the techniques illustrates in FIGS. 1A-1F and FIGS. 2A-2F can be combined to obtain the advantages of both the hydrogel and the photo-patternable polymer as a separator. FIGS. 3A-3F illustrate cross sectional views of a microbattery structure 300 during various stages of a third fabrication process performed according to examples of the present disclosure. As such, when viewed in sequence, FIGS. 3A-3F also serve as a flow diagram for the fabrication process.

Figure 3A:
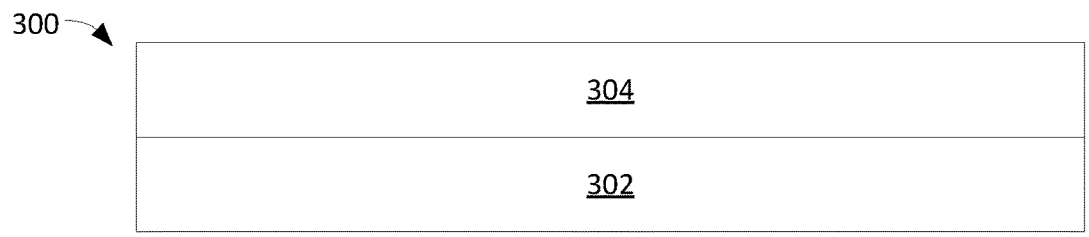
FIGS. 3A-3F illustrate cross sectional views of a microbattery structure during various stages of a third fabrication process performed according to examples of the present disclosure.

As illustrated in FIG. 3A, fabrication of the microbattery structure 300 begins by bonding a first polymer film layer 304 to a first glass substrate 302. In one example, the first polymer film layer 304 comprises a polyimide, such as poly (4,4'-oxydiphenylene-pyromellitimide), or polyethylene terephthalate (PET).

Figure 3B:
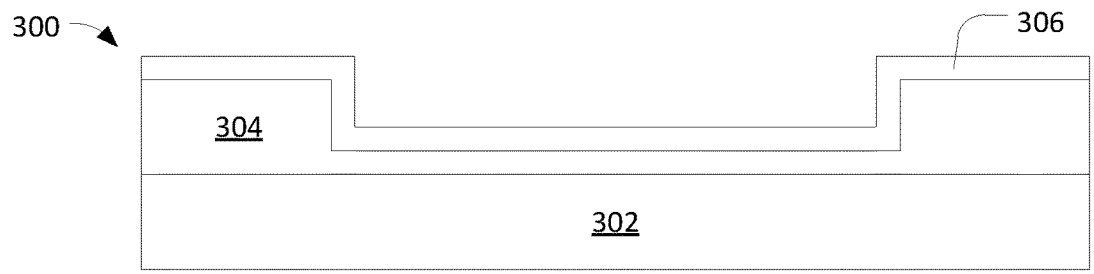

As illustrated in FIG. 3B, a trench is next created in the first polymer film layer 304. The trench may be formed, for example, by photolithography in combination with etching, or by embossing. The trench is subsequently lined with a first conformal metal layer 306. The first conformal metal layer 306 may be formed, for example, from titanium or nickel.

Figure 3C:
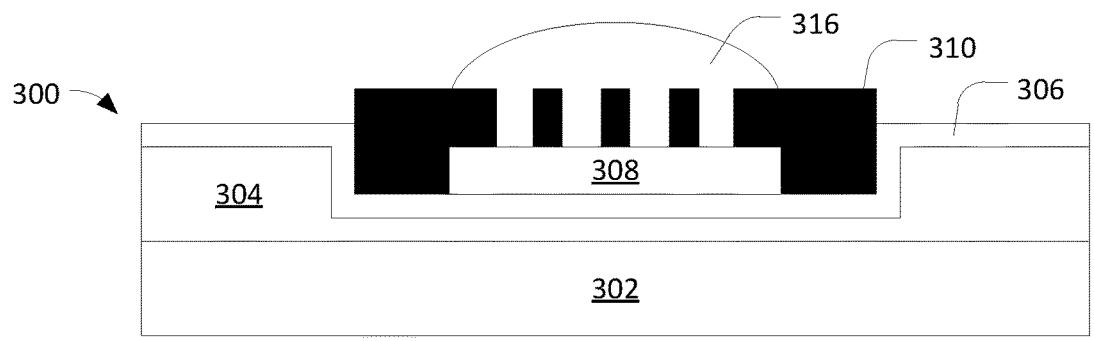

As illustrated in FIG. 3C, a negative terminal 308 is next plated on the first conformal metal layer 306, within the trench area. The negative terminal 308 may be formed, for example, from zinc, or from an alloy of zinc with indium or with tin. A photo-patternable polymer layer 310 is then applied to the negative terminal 308, for example by a spin coating process in which a photo-patternable polymer is applied in liquid form (e.g., in a range of approximately 750 to 3000 rounds per minute), and excess liquid from the photo-patternable polymer is spun off the top surface of the negative terminal 308. In one example, this results in the photo-patternable polymer layer 310 having a thickness of approximately two micrometers; thus, the raised topography of the negative terminal 308 in this case allows for a thinner coating of the photo-patternable polymer to be applied to the negative terminal 308 (i.e., as compared to the remainder of the microbattery structure 300). The photo-patternable polymer layer 310 is then patterned into a mesh, for example using a photolithography process. In one example, the photo-patternable polymer layer 310 may be soft-baked (i.e., pre-exposure) and/or post-exposure baked at a temperature within the range of approximately sixty-five to one hundred degrees Celsius, while a final hard bake may be performed at a temperature in the range of approximately 150 to 250 degrees Celsius. Thus, the final photo-patternable polymer layer 310 comprises a polymer mesh that is coated, aligned, and patterned in a manner similar to photoresist in a semiconductor line. The mesh may contain pores having a size of approximately two micrometers square. In one example, the photo-patternable polymer layer 310 comprises a phenoxy-based resin (e.g., one or more of a family of Bisphenol-A/epichlorohydrin linear polymers). For instance, the photo-patternable polymer layer 310 may contain a mixture of an epoxy, a phenoxy-based resin, and a solvent such as propylene glycol monomethyl ether acetate. The phenoxy-based resin may further include a photo-package to enable lithographic processing.

In addition, a hydrogel layer 316 is applied to fill the pores of the photo-patternable polymer layer 310 and to increase the overall hydrophilicity of the mesh. For instance, the hydrogel layer 316 may be applied by precision dispensing, stenciling, injecting, or brushing onto the photo-patternable polymer layer 310. In one example, the hydrogel comprises a network of polymer chains that are hydrophilic. For instance, the hydrogel may comprise a colloidal gel in which water is the dispersion medium. As a specific example, the hydrogel may comprise a polyethylglycol (PEG)-based system with water and a photocatalyst, a polyvinylpyrrolidone (PVP)-based system with a photocatalyst, polyethylene oxide (PEO), poly vinyl alcohol (PVA), or polyacrylamide. In one example, the hydrogel layer 316 has a thickness of approximately ten to twenty micrometers. The hydrogel layer 316, in combination with the photo-patternable polymer layer 310, will form the separator of the final microbattery structure 300.

Figure 3D:
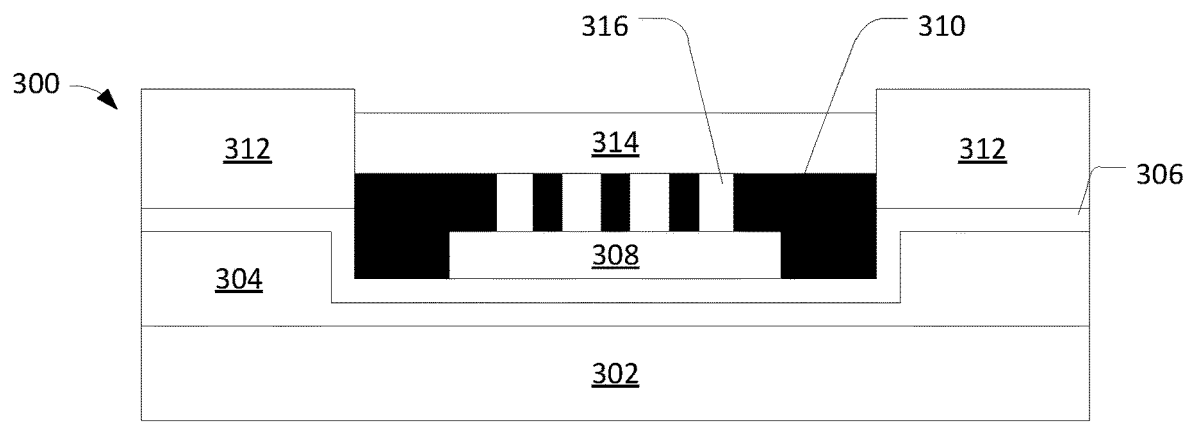

As illustrated in FIG. 3D, a seal 312 is deposited on the first conformal metal layer 306, outside of the trench, i.e., so that the seal 312 surrounds the trench, the negative terminal 308, the photo-patternable polymer layer 310, and the hydrogel layer 316. An electrolyte is injected into the microbattery structure 300 and absorbed by the hydrogel layer 316. A positive terminal 314 is then deposited on the photo-patternable polymer layer 310 and hydrogel layer 316. As the hydrogel layer 316 is compressed by the positive terminal 314, it is held in place by the seal 312, by the positive terminal 314, and by the photo-patternable polymer layer 310. The positive terminal 314 may comprise, for example, a paste such as a manganese dioxide paste having particle sizes between approximately two and thirty micrometers. In further examples, the inclusion of the hydrogel layer 316 allows the particle sizes of the paste to be even smaller, since the hydrogel will prevent the particles from passing through the pores of the mesh photo-patternable polymer layer 310. Thus, the particles of the paste may even be smaller than the pores of the mesh.

Figure 3E:
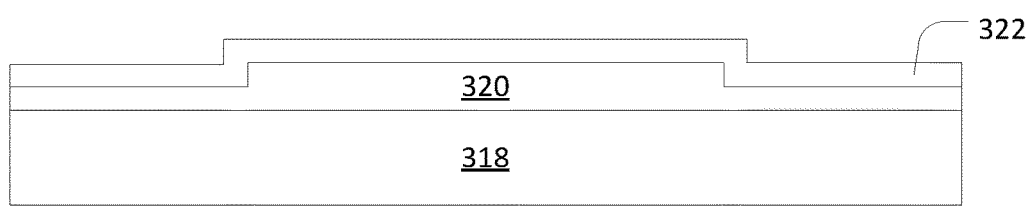

As illustrated in FIG. 3E, a pedestal is next fabricated, separately from the microbattery structure 300 that was assembled and depicted in FIGS. 3A-3D. Fabrication of the pedestal begins by bonding a second polymer film layer 320 to a second glass substrate 318. In one example, the second polymer film layer 320 comprises a polyimide, such as poly (4,4'-oxydiphenylene-pyromellitimide), or polyethylene terephthalate (PET). The second polymer film layer 320 may be etched to form a mesa or pedestal in its center, as illustrated. The second polymer film layer 320 is then coated with a second conformal metal layer 322. The second conformal metal layer 322 may comprise, for example, titanium, nickel, or indium tin oxide.

Figure 3F:
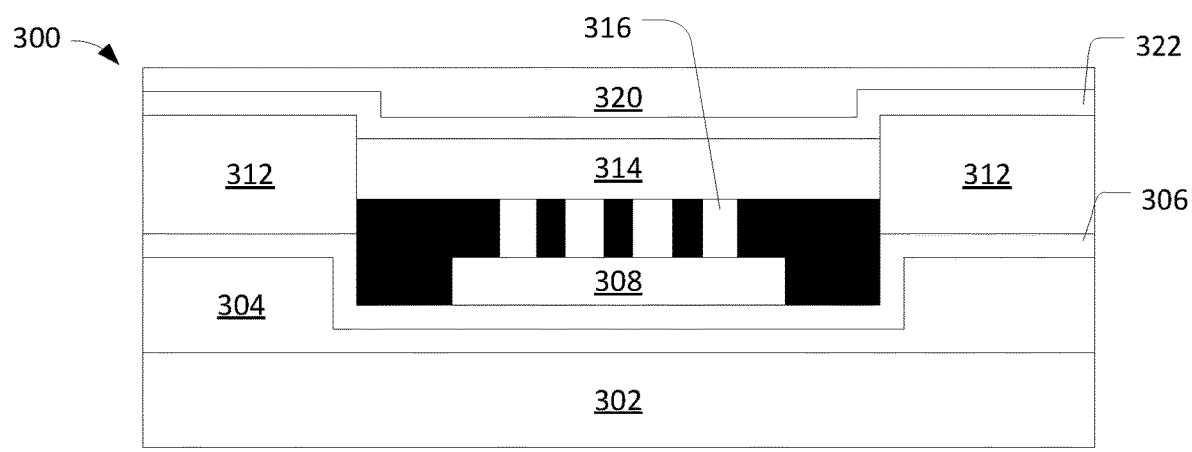

As illustrated in FIG. 3F, the pedestal illustrated in FIG. 3E is then assembled to the microbattery structure 300 that was assembled and depicted in FIGS. 3A-3D to seal the microbattery structure 300. In one example, this assembly step involves inverting the pedestal such that the second conformal metal layer 322 is positioned adjacent to the seal 312 and the positive terminal 314. In one example, the second glass substrate 318 is removed.

The combination of the mesh photo-patternable polymer layer 310 and the hydrogel layer 316 acts as a permeable separator between the negative terminal 308 and the positive terminal 314 of the microbattery structure 300. The mesh structure of the photo-patternable polymer layer 310 allows the electrolyte, which is absorbed by the hydrogel layer 316, to pass freely between the negative terminal 308 and the positive terminal 314, while maintaining mechanical separation between the negative terminal 308 and the positive terminal 314. The ability to precisely apply and/or pattern the photo-patternable polymer layer 310 and the hydrogel layer 316 during fabrication of the microbattery structure 300 makes it an ideal separator for the very small scale microbattery structure 300.

Although various embodiments which incorporate the teachings of the present invention have been shown and described in detail herein, those skilled in the art can readily devise many other varied embodiments that still incorporate these teachings.

What is claimed is:

1. A method of fabricating a battery, comprising:
forming a first polymer film layer;
forming a trench in the first polymer film layer;
lining the trench with a first conformal metal layer;
forming a negative terminal in the trench, such that the first conformal metal layer is positioned directly between the first polymer film layer and the negative terminal;
fabricating a separator on the negative terminal, wherein the separator comprises a hydrogel, wherein the hydrogel is comprised of a polyethylglycol-based system of water;
forming a positive terminal on the separator, so that the separator physically separates the negative terminal from the positive terminal; and
injecting an electrolyte between the negative terminal and the positive terminal.

2. The method of claim 1, wherein the fabricating the separator comprises:
precision dispensing the hydrogel onto the negative terminal.

3. The method of claim 1, wherein the fabricating the separator comprises:
stenciling the hydrogel onto the negative terminal.

4. The method of claim 1, wherein the fabricating the separator comprises:
injecting the hydrogel onto the negative terminal.

5. The method of claim 1, wherein the fabricating the separator comprises:
brushing the hydrogel onto the negative terminal.

6. The method of claim 1, wherein the separator further comprises a patterned polymer mesh, and the hydrogel fills pores of the patterned polymer mesh.

7. The method of claim 1, wherein the separator further comprises a patterned polymer mesh, and the hydrogel fills pores of the patterned polymer mesh.

8. The method of claim 7, wherein the photo-patternable polymer comprises a phenoxy-based resin.

9. The method of claim 8, wherein the photo-patternable polymer further comprises a photo-package.

10. The method of claim 6, wherein the patterned polymer mesh has a pore size of two micrometers square or smaller.

11. The method of claim 1, wherein the electrolyte is absorbed in the hydrogel.

12. The method of claim 1, wherein the hydrogel includes a photocatalyst.

13. The method of claim 1, wherein the hydrogel has a thickness of between ten and twenty micrometers.

14. A method of fabricating a battery, comprising:
forming a first polymer film layer;
forming a trench in the first polymer film layer;
lining the trench with a first conformal metal layer;
forming a negative terminal in the trench, such that the first conformal metal layer is positioned directly between the first polymer film layer and the negative terminal;
fabricating a separator on the negative terminal, wherein the separator comprises a hydrogel;
forming a positive terminal on the separator, so that the separator physically separates the negative terminal from the positive terminal;
injecting an electrolyte between the negative terminal and the positive terminal;
forming a second conformal metal layer positioned adjacent to the positive terminal, and
forming a second polymer film layer, wherein the second conformal metal layer is positioned directly between the second polymer film layer and the positive terminal.

15. The method of claim 14, further comprising:
surrounding the negative terminal and the hydrogel with a seal, wherein the first conformal metal layer is positioned directly between the first polymer film layer and the seal;
and
positioning the second conformal metal layer directly between the second polymer film layer and the seal.

16. The method of claim 15, further comprising:
forming a mesa in the second polymer film layer.

17. The method of claim 15, wherein the electrolyte is absorbed in the hydrogel.

18. The method of claim 14, wherein the separator further comprises a patterned polymer mesh, and the hydrogel fills pores of the patterned polymer mesh.

19. The method of claim 18, wherein the fabricating the separator comprises: spin coating a layer of a photo-patternable polymer in liquid form onto the negative terminal;
patterning the layer of the photo-patternable polymer, using a photolithography technique, to form the patterned polymer mesh.

20. The method of claim 14, wherein the hydrogel comprises a polyethylglycol-based system with water.

* * * * *